US009636969B2

(12) United States Patent
Maehata (10) Patent No.: US 9,636,969 B2
(45) Date of Patent: May 2, 2017

(54) AIR CONDITIONING APPARATUS (75) Inventor: Hiromitsu Maehata, Nagoya (JP)

(73) Assignee: Denso International America, Inc., Southfield, MI (US)

( * ) Notice: Subject to any disclaimer, the term of this patent is extended or adjusted under 35 U.S.C. 154(b) by 1372 days.

(21) Appl. No.: 13/397,802

(22) Filed: Feb. 16, 2012

(65) Prior Publication Data
US 2012/0247744 A1 Oct. 4, 2012

Related U.S. Application Data (60) Provisional application No. 61/470,312, filed on Mar. 31, 2011.

(51) Int. Cl.
*B60H 1/00* (2006.01)
(52) U.S. Cl.
CPC ... *B60H 1/00828* (2013.01); *B60H 2001/002* (2013.01); *B60H 2001/00099* (2013.01)
(58) Field of Classification Search
CPC ............ B60H 1/00828; B60H 1/00864; B60H 1/00064; B60H 2001/00099
See application file for complete search history.

(56) References Cited

U.S. PATENT DOCUMENTS

| 4,523,715 | A  | * | 6/1985  | Ohsawa    | B60H 1/00828 165/43 |
| 6,422,309 | B2 | * | 7/2002  | Vincent   | 165/202 |
| 6,578,771 | B2 | * | 6/2003  | Kaneura   | B60H 1/00064 165/42 |
| 2006/0053815 | A1 | * | 3/2006  | Naruse    | B60H 1/00828 62/244 |
| 2009/0236089 | A1 | * | 9/2009  | Major     | B60H 1/00807 165/299 |
| 2010/0022178 | A1 | * | 1/2010  | Yamaguchi | B60H 1/00828 454/159 |
| 2010/0248604 | A1 | * | 9/2010  | Kanemaru  | B60H 1/00064 454/75 |
| 2011/0005710 | A1 | * | 1/2011  | Nanaumi   | B60H 1/00064 165/61 |
| 2011/0005713 | A1 | * | 1/2011  | Seto      | B60H 1/00028 165/61 |
| 2011/0005734 | A1 | * | 1/2011  | Nanaumi   | B60H 1/00064 165/122 |

* cited by examiner

*Primary Examiner* — Steven B McAllister
*Assistant Examiner* — Jonathan Cotov
(74) *Attorney, Agent, or Firm* — Harness, Dickey & Pierce, P.L.C.

(57) ABSTRACT

The present disclosure describes an air conditioning apparatus comprising an air conditioning case defining an airflow passage, an evaporator accommodated in the air conditioning case, a first blower located at an upstream side of the evaporator creating a first airflow in the airflow passage, a second blower located at an upstream side of the evaporator creating a second airflow in the airflow passage, and a controller electrically connected to the first blower and the second blower. The controller controls the first blower and the second blower based on a target total airflow amount. The first airflow and the second airflow are mixed at the upstream side of the evaporator. The air conditioning apparatus further comprises means for preventing the first airflow from being directed into the second blower.

7 Claims, 11 Drawing Sheets

AIR CONDITIONING APPARATUS

CROSS-REFERENCE TO RELATED APPLICATIONS

This application claims the benefit of U.S. Provisional Application No. 61/470,312, filed on Mar. 31, 2011. The entire disclosure of the above application is incorporated herein by reference.

FIELD

The present disclosure relates to an air conditioning apparatus.

BACKGROUND

An air conditioning apparatus, which has two blowers and a single evaporator disposed at downstream of the two blowers, is known by US 2010/0248604. The air conditioning apparatus defines separated airflow passages for the respective blowers by using a separation wall. The separation wall contributes to avoid undesired reverse airflow directed into one of the blowers.

However, since the separation wall defines two airflow passages to the single evaporator core, if one of the blowers does not create enough airflow, a part of the evaporator core, which is disposed in the less airflow passage, may be frosted.

Therefore, even if passengers of the vehicle do not need high volume airflow, the air conditioning apparatus disclosed by the US2010/0248064 needs to keep running the two blowers together above a certain degree to prevent the evaporator from being frosted. To keep the both blowers running together ultimately will affect fuel consumption.

More specifically, the present disclosure provides a structure and a control method for an air conditioning apparatus, which has two blowers with a single evaporator core, and is able to operate with a single blower at minimum power consumption to prevent evaporator frosting and undesired reverse airflow.

SUMMARY

The present disclosure describes an air conditioning apparatus for a vehicle cabin comprising an air conditioning case defining an airflow passage, an evaporator accommodated in the air conditioning case, a first blower located at an upstream side of the evaporator, creating a first airflow in the airflow passage, a second blower located at an upstream side of the evaporator, creating a second airflow in the airflow passage, a control panel disposed in the vehicle cabin operated by a user for setting preferred air condition setting of the user, and a controller electrically connected to the first blower, the second blower and the control panel.

The controller is configured to calculate a target total airflow amount based on at least the preferred air condition setting. The controller is further configured to determine a blower level of the first blower to provide the first airflow and a blower level of the second blower to provide the second airflow based on the target total airflow amount. The first airflow and the second airflow are mixed at the upstream side of the evaporator.

When the target total airflow amount is less than a predetermined total airflow amount, an amount of increase of the first blower level per a unit increase of the target total airflow amount is larger than that of the second blower level. When the target total airflow amount is equal to or greater than the predetermined total airflow amount, the amount of increase of the first blower level per the unit increase of the target total airflow amount is smaller than that of the second blower level.

More specifically, the predetermined total airflow amount is approximately equal to an amount of the first airflow created by a maximum blower level of the first blower. The increasing amount of the second blower level per the unit increase of the target total airflow amount corresponds to an increase of static pressure of the first airflow.

Another aspect of this disclosure is a method of controlling an air conditioning apparatus for a vehicle cabin, the air conditioning apparatus equipped with an air conditioning case defining an airflow passage, an evaporator accommodated in the air conditioning case, a control panel disposed in the vehicle cabin operated by a user for setting a preferred air condition setting of the user, a first blower located at an upstream side of the evaporator creating a first airflow in the airflow passage, and a second blower located at an upstream side of the evaporator creating a second airflow in the airflow passage, wherein the first airflow and the second airflow are mixed at the upstream side of the evaporator. The method comprising, determining a target total airflow amount based on at least the preferred air condition setting of the user, setting a blower level of the first blower based on the target total airflow amount, and then, setting a blower level of the second blower based on the blower level of the first blower, when the target total airflow amount is less than a predetermined total airflow amount, and setting the blower level of the first blower to its maximum blower level, and setting the blower level of the second blower to achieve the target total airflow amount, when the target total airflow amount is equal to or greater than the predetermined total airflow amount. When the target total airflow amount is less than the predetermined total airflow amount, the blower level of the second blower may be set to create the second airflow, having a dynamic pressure equal to a static pressure of the first airflow.

Another aspect of this disclosure is an air conditioning apparatus for a vehicle cabin comprising, an air conditioning case defining an airflow passage, an evaporator accommodated in the air conditioning case, a first blower located at an upstream side of the evaporator creating a first airflow in the airflow passage, a second blower located at an upstream side of the evaporator creating a second airflow in the airflow passage, a control panel disposed in the vehicle cabin operated by a user for setting preferred a air condition setting of the user, and a controller electrically connected to the first blower, the second blower and the control panel. The controller is configured to calculate a target total airflow amount based on at least the preferred air condition setting of the user. The controller is further configured to determine a blower level of the first blower and a blower level of the second blower based on the target total airflow amount. The first airflow and the second airflow are mixed at the upstream side of the evaporator. The air conditioning apparatus further comprises means for preventing the first airflow from being directed into the second blower. When the target total airflow amount is less than a predetermined total airflow amount, the controller mainly uses the first blower, and the preventing means prevents the first airflow from being directed into the second blower. The preventing means may be a curtain door and the curtain door is rotatably supported in the air conditioning case to be able to rotate by at least either one of a pressure of the first airflow and the second airflow, or may be a damper actuated by a motor.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The preferred embodiments will now be described more fully with reference to FIGS. 1-16 of the accompanying drawings. The reference number indicates the same or corresponding features among Figures.

First Embodiment

Figure 1:
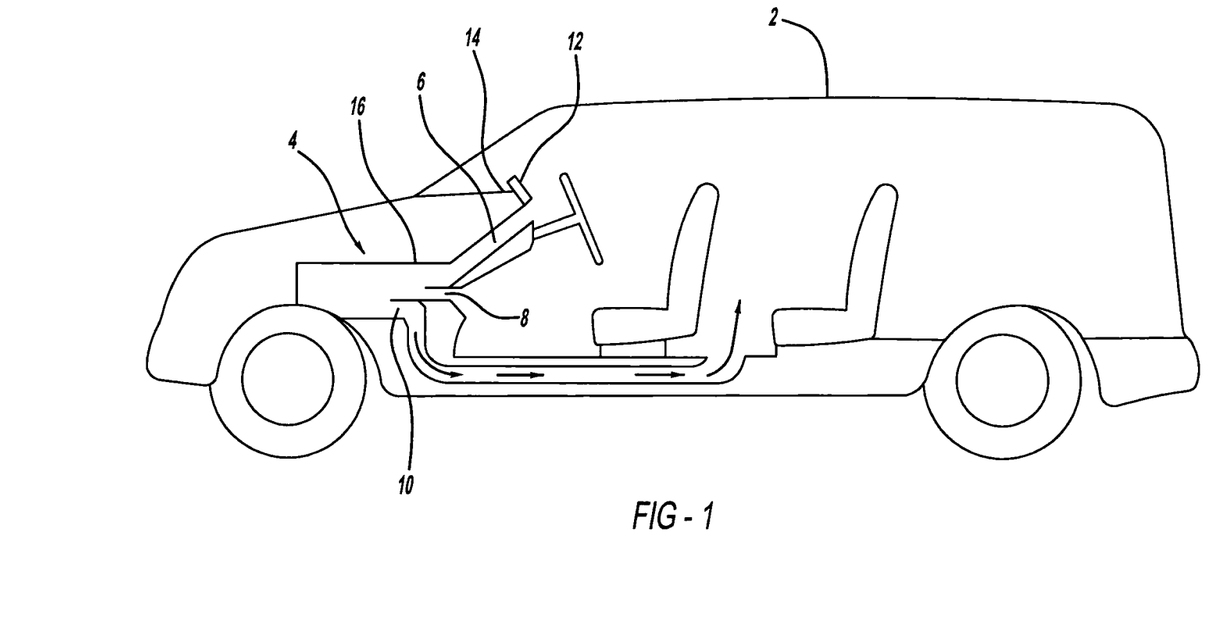
FIG. 1 is a cross sectional schematic view of a vehicle accommodating an air conditioning apparatus in the first embodiment.

FIGS. 1-7 depict the first embodiment. FIG. 1 is a cross sectional schematic view of a vehicle 2. The vehicle 2 accommodates an air conditioning apparatus 4. In this embodiment, the air conditioning apparatus 4 has a front face air passage 6, a front foot air passage 8, and a rear air passage 10. A user of the vehicle 2 may input his or her preferred vehicle cabin temperature, airflow amount, air intake mode, and/or air distribution mode via a control panel 12 disposed on an instrument panel 14 of the vehicle 2.

Figure 2:
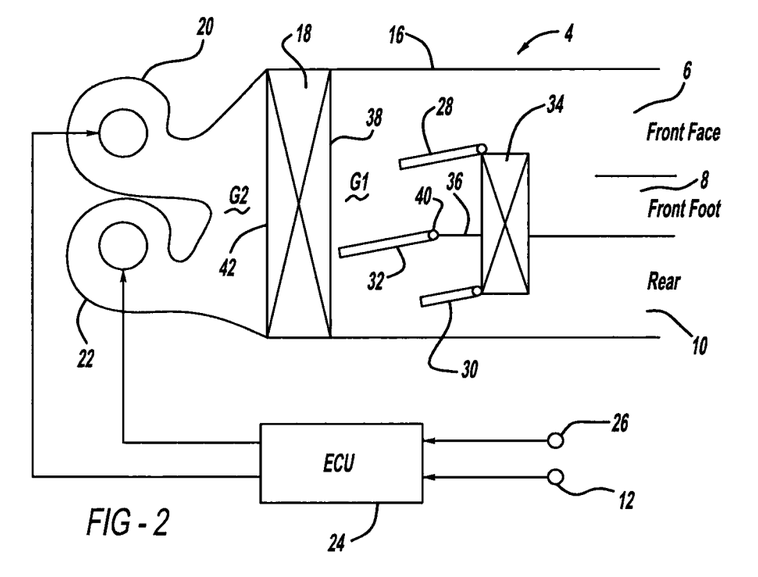
FIG. 2 is a cross sectional schematic view of an air conditioning apparatus in the first embodiment.

FIG. 2 is a cross sectional schematic view of the air conditioning apparatus 4. The air conditioning apparatus 4 comprises an air conditioning case 16 defining airflow passages, an evaporator 18 accommodated in the air conditioning case 16, a first blower 20 located at an upstream side of the evaporator 18 creating a first airflow in the air conditioning case 16, and a second blower 22 located at an upstream side of the evaporator 18 creating a second airflow in the air conditioning case 16. The first airflow and the second airflow may be mixed at the upstream side of the evaporator 18.

The air conditioning apparatus 4 further comprises a controller 24 electrically connected to control panel 12, sensors 26, doors 28, 30 and 32 and blowers 20, 22 in the air conditioning apparatus 4. The controller 24 controls the first blower 20 and the second blower 22 to create a target total airflow amount by combining the first airflow and the second airflow. The first blower 20 may introduce either one of fresh outside air, recirculation air, or both. The second blower 22 may introduce recirculation air from vehicle cabin.

The air conditioning case 16 accommodates a heater core 34, a dividing wall 36, the front air-mix door 28, the rear air-mix door 30, and the flow ratio control door 32. The heater core 34 is disposed on a downstream side of the evaporator 18, and is divided by the dividing wall 36. The flow ratio control door 32 disposed in a gap (G1) defined between a downstream heat exchange surface 38 of the evaporator 18 and an upstream end portion 40 of the dividing wall 36. The axis of the flow ratio control door 32 is on the upstream end portion 40 of the dividing wall 36. The flow ratio control door 32 may be an airflow volume control structure between airflow directed to a front side of the vehicle cabin and airflow directed to a rear side of the of the vehicle cabin.

The dividing wall 36 divides the air conditioning case 16 into the front air passages 6, 8 and the rear air passage 10. The front air-mix door 28 is located in the upstream side of the front air passages 6, 8. The front air-mix door 28 rotates around its axis disposed on an upstream edge of the heater core 34. Likewise, the rear air-mix door 30 is located in the rear air passage 10. The rear air-mix door 30 rotates around its axis disposed on the other upstream edge of the heater core 34.

The first blower 20 and the second blower 22 may be scroll fans. Each scroll fan has a scroll case and a centrifugal multi blade fan. Downstream ends of the outlets of the scroll cases define a gap (G2) with an upstream heat exchange surface 42 of the evaporator 18. Thus, airflows created by the two blowers 20, 22 are mixed before the evaporator 18, even if one of the two blowers 20, 22 does not create enough airflow, the airflow is distributed to the upstream heat exchange surface 42 of the evaporator 18. Thus, the evaporator 18 is prevented from partial frosting.

Figure 3:
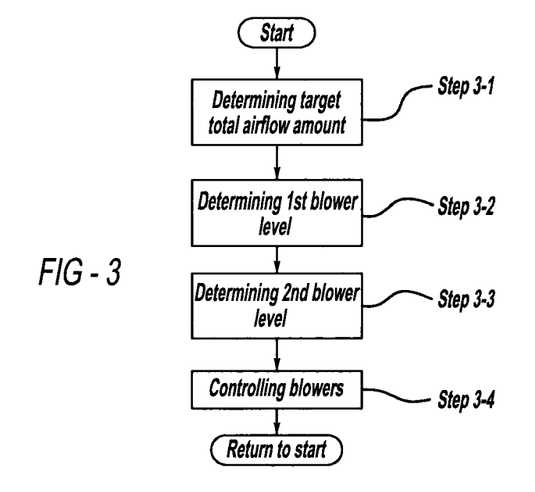
FIG. 3 is a flowchart describing a control method for two blowers carried out by a controller in the first embodiment.

FIG. 3 is a flowchart describing a control method for two blowers 20, 22 carried out by the controller 24 in the first embodiment. In step 3-1, the controller 24 determines a target total airflow amount based on at least the preferred air condition setting of the user. In this embodiment, the controller 24 obtains information from the control panel 12 and is configured to calculate the target airflow amount. More specifically, the controller 24 calculates the target total airflow amount based on the preferred air condition setting including set vehicle cabin temperature, set blower level, set air distribution mode, and various environmental factors detected by the sensors 26 such as the actual vehicle cabin temperature, ambient air temperature, and sunlight conditions. In step 3-2, the controller 24 determines a first blower level, and then, the controller 24 proceeds to step 3-3. In step 3-3, the controller 24 determines a second blower level, and then, the controller 24 proceeds to step 3-4. In step 3-4, the controller 24 outputs controlling signals to the two blowers 20, 22.

Figure 4:
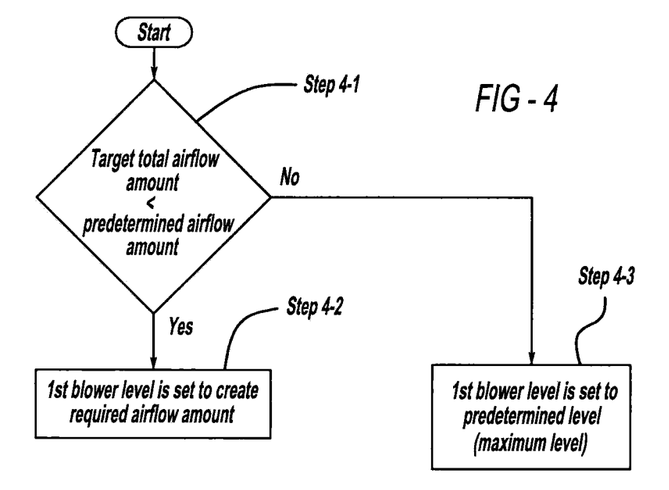
FIG. 4 is a flowchart describing a determination of the first blower level in the first embodiment.

FIG. 4 is a flowchart describing a determination of first blower level in the first embodiment. In step 4-1, the controller 24 determines if the target total airflow amount is less than a predetermined total airflow amount. If the target total airflow amount is less than a predetermined total airflow amount, the controller 24 proceeds to step 4-2, otherwise proceeds to step 4-3. In step 4-2, the controller 24 sets a blower level of the first blower 20 based on the target total airflow amount. In step 4-3, the controller 24 sets the blower level of the first blower 20 to a predetermined maximum blower level.

Figure 5:
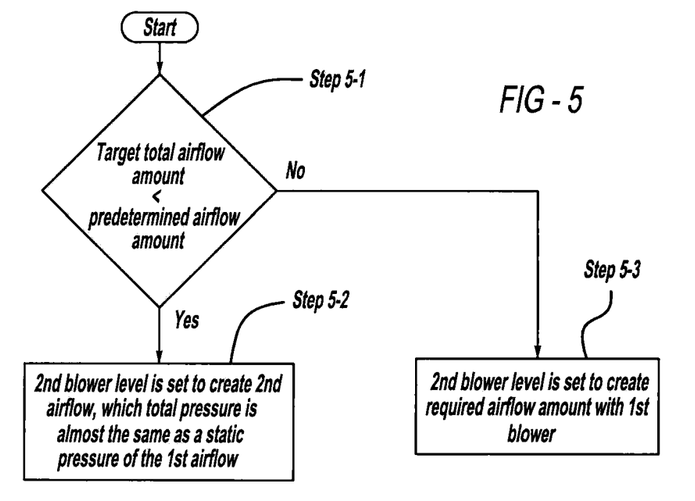
FIG. 5 is a flowchart describing a determination of the second blower level in the first embodiment.

FIG. 5 is a flowchart describing a determination of the second blower level in the first embodiment. In step 5-1, the controller 24 determines if the target total airflow amount is less than a predetermined total airflow amount. If the target total airflow amount is less than a predetermined total airflow amount, the controller 24 proceeds to step 5-2, otherwise proceeds to step 5-3. In step 5-2, the controller 24 sets a blower level of the second blower 22 based on the blower level of the first blower 20. In step 5-3, the controller 24 sets the blower level of the second blower 22 based on the target total airflow amount.

Figure 6:
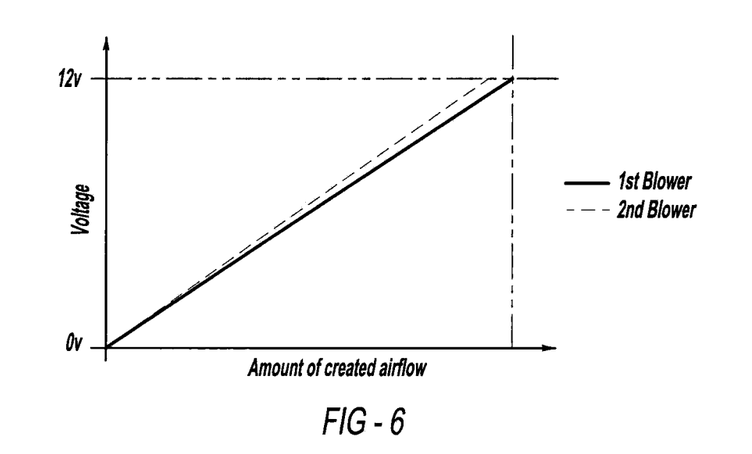
FIG. 6 is a graph showing characteristics of the first and second blowers.

FIG. 6 is a voltage vs. airflow amount graph showing characteristics of first and second blowers 20, 22. In this embodiment, the ability of the first blower 20 is almost the same as that of the second blower 22. The ability of the first blower 20 can be greater than that of the second blower 22 in another embodiment.

Figure 7:
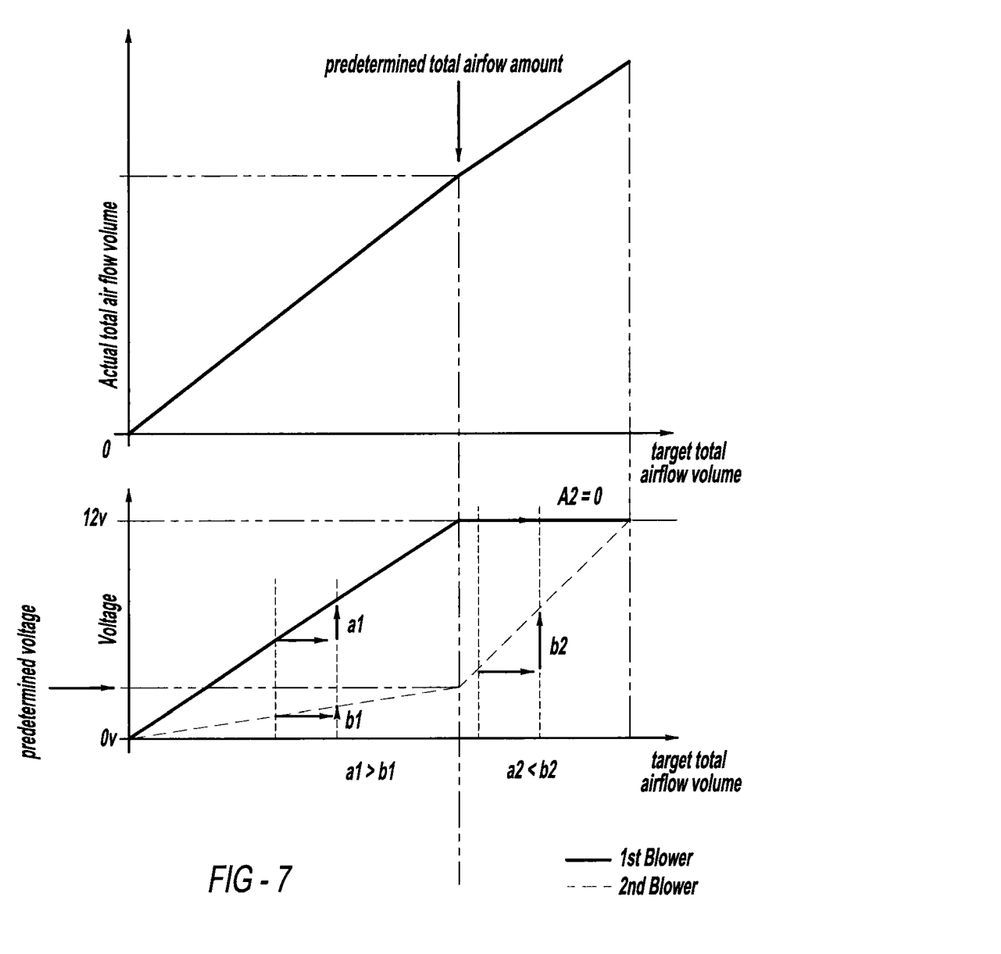
FIG. 7 depicts a relationship of the target total airflow amount, blower levels, and the actual total airflow volume created by the two blowers in the first embodiment.

FIG. 7 depicts the relationship of target total airflow amount, blower voltage levels, and the actual total airflow volume created by the two blowers in the first embodiment. The upper graph shows the relationship between target total airflow volumes and the actual total airflow volume. The lower graph shows the relationship between the target total airflow volume and each blower's voltage level.

The voltage level of the first blower 20 is linearly increased to 12 volts in accordance with an increase of the target total airflow amount. The voltage level of the second blower 22 is also linearly increased to a predetermined voltage in accordance with the target total airflow amount. At this time, increasing the amount of the second blower level per the unit increase of the target total airflow amount (indicated by "b1") corresponds to an increase amount of static pressure of the first airflow. The controller 24 changes the increasing ratio of the blower voltage of the second blower 22 after the blower voltage of the first blower 20 reaches 12 volts (the maximum blower level of the first blower 20).

In other words, when the target total airflow amount is less than a predetermined total airflow amount, the amount of increase of the first blower voltage level per a unit increase of the target total airflow amount (indicated by "a1") is larger than the amount of increase of the second blower voltage level per the unit increase of the target total airflow amount (indicated by "b1"). When the target total airflow amount is equal to or greater than the predetermined total airflow amount, the amount of increase of the first blower level (indicated by "a2," in this embodiment a2 is zero), is smaller than the amount of increase of the second (indicated by "b2").

Since the air conditioning apparatus 4 mixes two airflows at the upstream side of the evaporator 18, even when one of the blowers does not create enough airflow, evaporator 18 frosting may be prevented. Moreover, even when the first blower 20 creates almost all of the required airflow, the second blower 22 creates a small amount of airflow to prevent undesirable reverse airflow of the first airflow. The airflow amount created by the second airflow is still smaller than the airflow which is needed in the conventional art to prevent evaporator 18 frosting. Thus, the air conditioning apparatus 4 described in this embodiment improves the fuel consumption relative to the conventional art.

Second Embodiment

Figure 8:
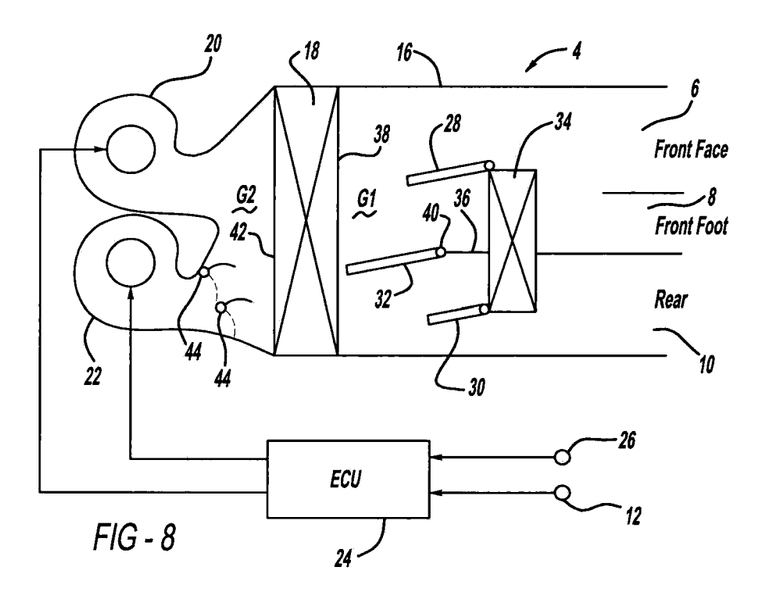
FIG. 8 is a cross sectional schematic view of an air conditioning apparatus in the second embodiment.
Figure 9:
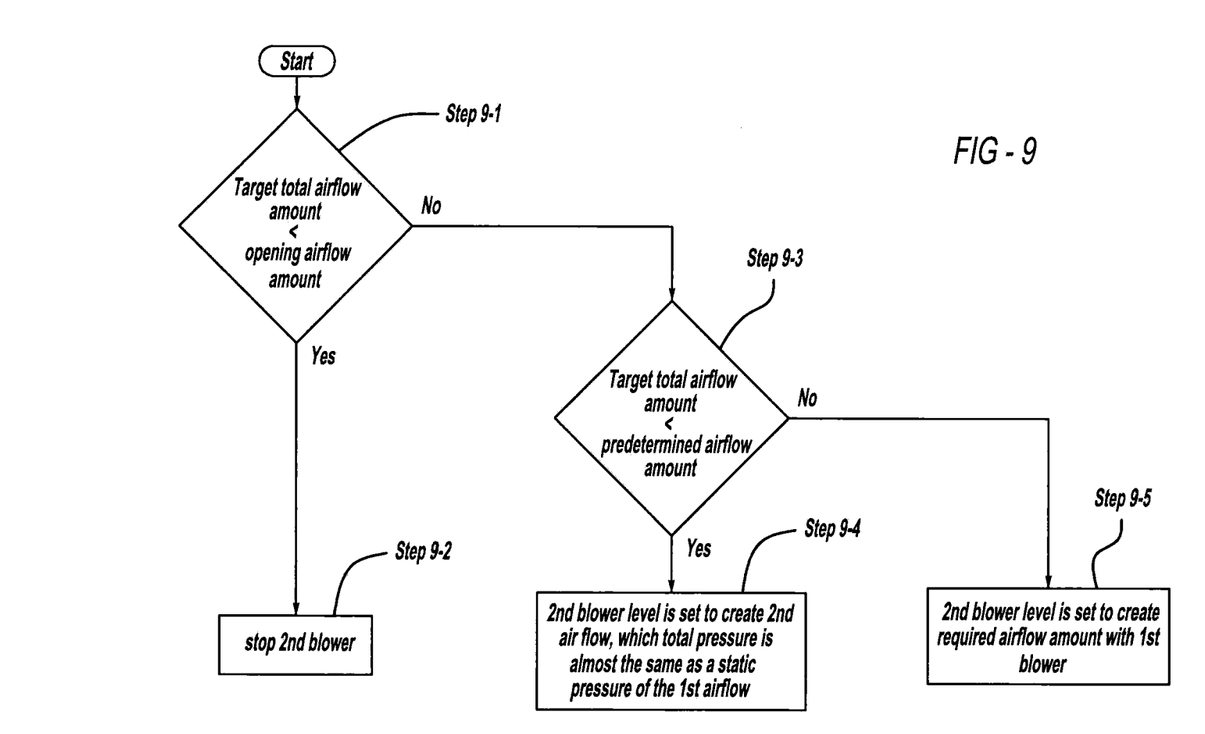
FIG. 9 is a flowchart describing a determination of the second blower level in the second embodiment.
Figure 10:
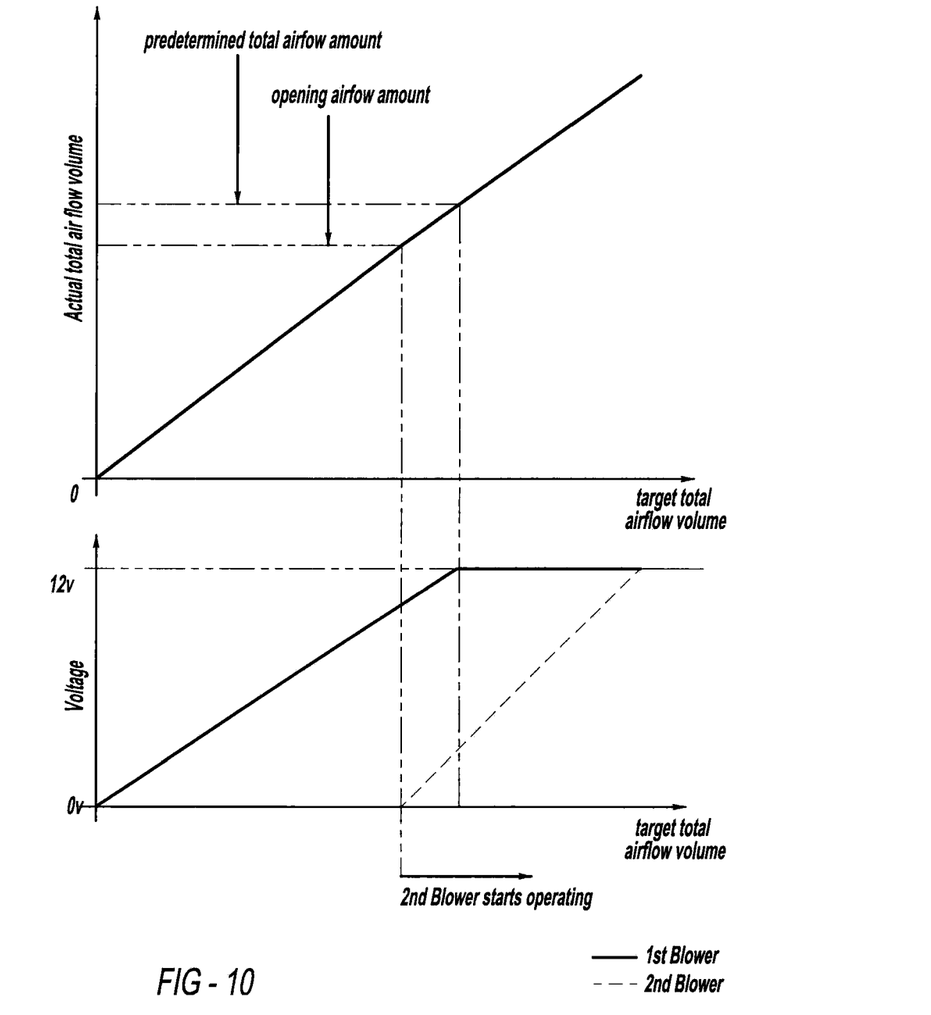
FIG. 10 depicts a relationship of the target total airflow amount, blower levels, and the actual total airflow volume created by two blowers in the second embodiment.

FIGS. 8-10 describe a second embodiment of this disclosure. FIG. 8 is a cross sectional schematic view of the air conditioning apparatus 4 in the second embodiment. In this second embodiment, the second blower 22 may have means for preventing reverse airflow. More specifically, the preventing means may be backflow prevention doors 44. The backflow prevention doors 44 are freely rotated and are opened and closed by pressure of the first airflow and pressure of the second airflow.

The determination of target total airflow volume and the level of the first blower 20 may be the same as the first embodiment. FIG. 9 is a flowchart describing a determination of the second blower level in the second embodiment. In step 9-1, the controller 24 determines if the target total airflow amount is smaller than a predetermined opening airflow amount. If the target total airflow amount is smaller than the predetermined opening airflow amount, the controller 24 proceeds to step 9-2, otherwise the controller 24 proceeds to step 9-3. In step 9-2, the controller 24 sets the blower voltage level of the second blower 22 to zero. In other words, the controller 24 stops the second blower 22.

In step 9-3, the controller 24 determines if the target total airflow volume is smaller than a predetermined blower level. If the target total airflow volume is smaller than the predetermined blower level, the controller 24 proceeds to step 9-4, otherwise the controller 24 proceeds to step 9-5. In step 9-4, the controller 24 sets the blower voltage level of the second blower 22 to a certain level that corresponds to a second airflow which creates enough pressure for opening the backflow prevention doors 44. In step 9-5, the controller 24 sets the blower voltage level of the second blower 22 to achieve the target total airflow volume with the first blower 20.

FIG. 10 depicts the relationship of target total airflow amount, blower levels, and the actual total airflow volume created by the two blowers in the second embodiment. In FIG. 10, the upper graph shows the relationship between target total airflow volumes and the actual total airflow volume. The lower graph shows the relationship between the target total airflow volume and each blower's voltage level.

The controller 24 controls the first blower 20 and the second blower 22 to create a target total airflow amount by combining the first airflow and the second airflow. The voltage level of the first airflow is linearly increased to 12 volts in accordance with the increase of the target total airflow amount.

The voltage level of the second airflow is kept at zero until the target total airflow volume has reached the opening airflow amount. In this embodiment, the opening airflow volume is less than the maximum airflow volume that can be created by only the first blower 20. After the target total airflow volume has reached the opening airflow volume, the blower voltage level of the second blower 22 starts increasing.

The air conditioning apparatus 4 in this embodiment also mixes the two airflows at upstream side of the evaporator 18, even when one of the blowers does not create enough airflow, evaporator 18 frosting may be prevented. Moreover, even when the first blower 20 creates almost all of the required airflow, the backflow prevention doors 44 prevent undesirable reverse airflow of the first airflow. Such backflow prevention doors 44 enable the second blower 22 to remain stopped. Thus, the air conditioning apparatus 4 described in this embodiment improves the fuel consumption relative to the conventional art.

Third Embodiment

Figure 11:
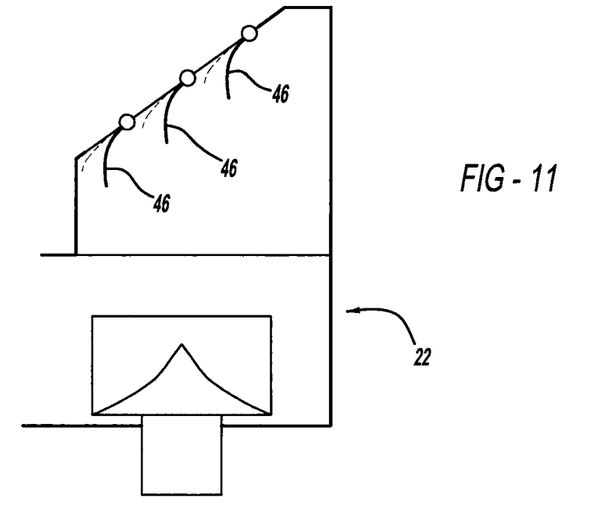
FIG. 11 is a cross sectional schematic view of an air conditioning apparatus in the third embodiment.

FIG. 11 is a cross sectional schematic view of an air conditioning apparatus 4 in the third embodiment. The third embodiment uses curtain doors 46 as the preventing means similar to backflow prevent door 44 described in the second embodiment, which can be rotated by the pressure of the blowers. More specifically, the preventing means in this third embodiment comprises curtain doors 46. The curtain doors 46 may be located at upstream side of the second blower 22. The curtain door 46 may be opened by their weight, and may be closed if the inside pressure of the second blower 22 is higher than ambient pressure and this pressure lifts up the curtain doors 46. The other elements of the third embodiment are similar to the second embodiment.

Fourth Embodiment

Figure 12:
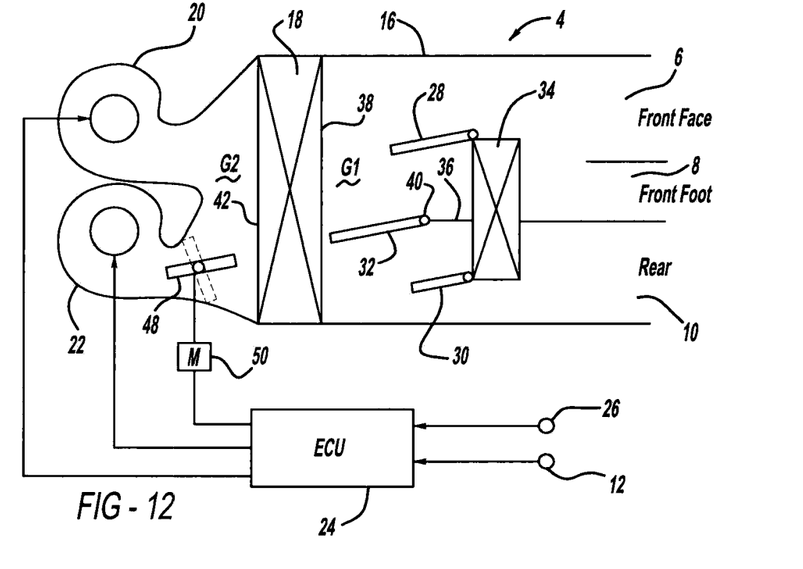
FIG. 12 is a cross sectional schematic view of an air conditioning apparatus in the fourth embodiment.

FIG. 12 is a cross sectional schematic view of the air conditioning apparatus 4 in the forth embodiment. In this forth embodiment, the preventing means is a motor actuated butterfly door 48. The controller 24 controls the butterfly door 48 via a motor 50.

Figure 13:
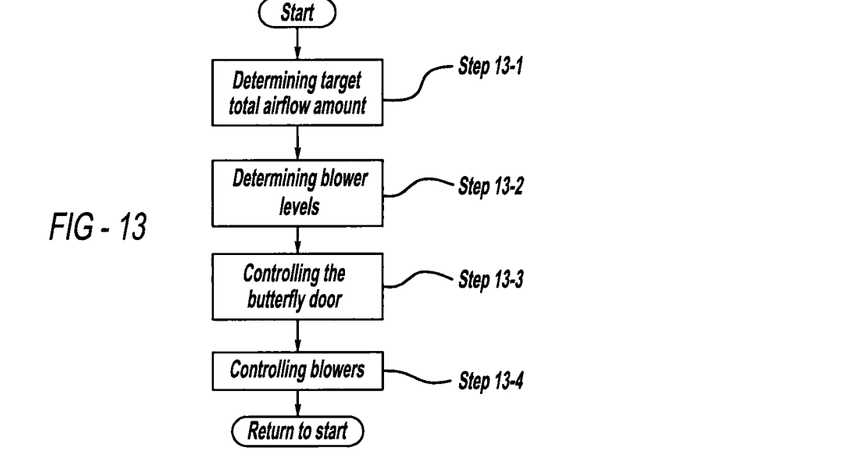
FIG. 13 is a flowchart describing a control method for the two blowers carried out by a controller in the forth embodiment.

FIG. 13 is a flowchart describing a control method for the two blowers 20, 22 and the motor 50 for actuating the butterfly door 48. In step 13-1, the controller 24 determines the target total airflow amount. In step 13-2, the controller 24 determines blower levels. In step 13-3 and 13-4, the controller 24 controls the two blowers 20, 22 and the motor 50. The determination methods of the target total airflow volume, and first blower voltage level are the same as the second embodiment.

Figure 14:
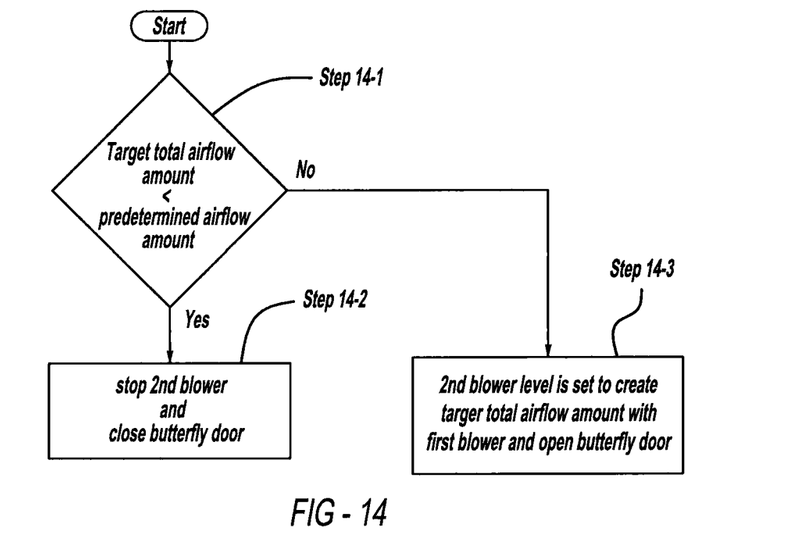
FIG. 14 is a flowchart describing a determination of the second blower level in the forth embodiment.

FIG. 14 is a flowchart describing a determination of the second blower level and operation of the butterfly door 48 in the forth embodiment. In step 14-1, the controller 24 determines whether the target airflow amount is smaller than the predetermined airflow amount. If the target airflow amount is smaller than the predetermined airflow amount, the controller 24 proceeds to step 14-2, otherwise the controller 24 proceeds to step 14-3.

In step 14-2, the controller 24 sets the blower voltage level of the second blower 22 to zero, and closes the butterfly door 48. In step 14-3, the controller 24 sets the blower voltage level of the second blower 22 to achieve the target total airflow amount and opens the butterfly door 48.

Figure 15:
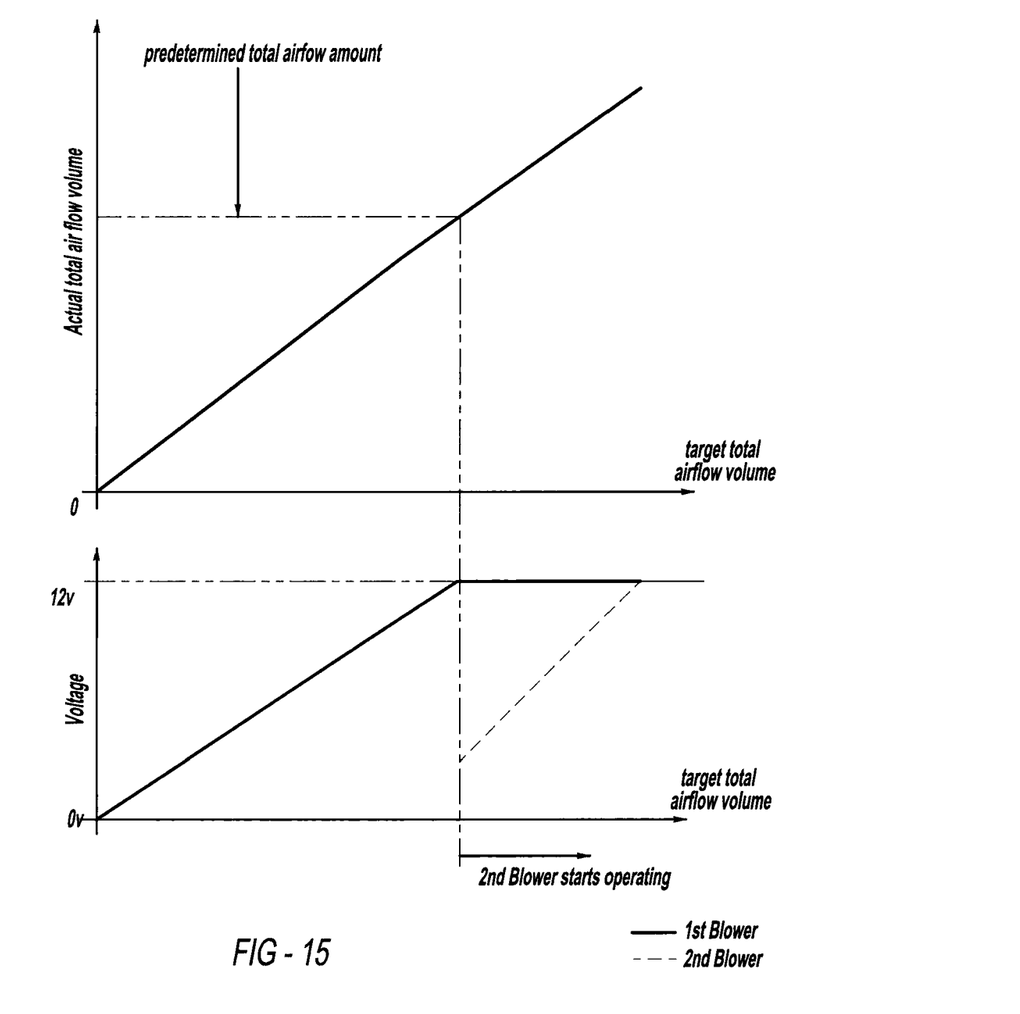
FIG. 15 depicts a relationship of the target total airflow amount, blower levels, and the actual total airflow volume created by two blowers in the fourth embodiment.

FIG. 15 depicts the relationship of the target total airflow amount, blower levels, and the actual total airflow volume created by the two blowers 20, 22 in the fourth embodiment. In FIG. 15, the upper graph shows the relationship between target total airflow volumes and the actual total airflow volume. The lower graph shows the relationship between the target total airflow volume and each blower's voltage level.

The controller 24 controls the first blower 20 and the second blower 22 to create a target total airflow amount by combining the first airflow and the second airflow. The voltage level of the first airflow is linearly increased to 12 volts in accordance with an increase of the target total airflow amount.

The butterfly door 48 is closed and the voltage level of the second airflow is kept at zero until the target total airflow volume has reached the predetermined airflow amount. After the target total airflow volume has reached the predetermined airflow volume, the butterfly door 48 is opened and the blower voltage level of the second blower 22 starts increasing.

The air conditioning apparatus 4 of this embodiment also mixes the two airflows at an upstream side of the evaporator 18. Even when one of the blowers does not create enough airflow, evaporator 18 frosting may be prevented. Moreover, even when the first blower 20 creates almost all of the required airflow, the butterfly door 48 prevents undesirable reverse airflow of the first airflow. Such butterfly door 48 enables the second blower 22 to remain stopped. Thus, the air conditioning apparatus 4 described in this embodiment improves the fuel consumption relative to the conventional art.

Fifth Embodiment

Figure 16:
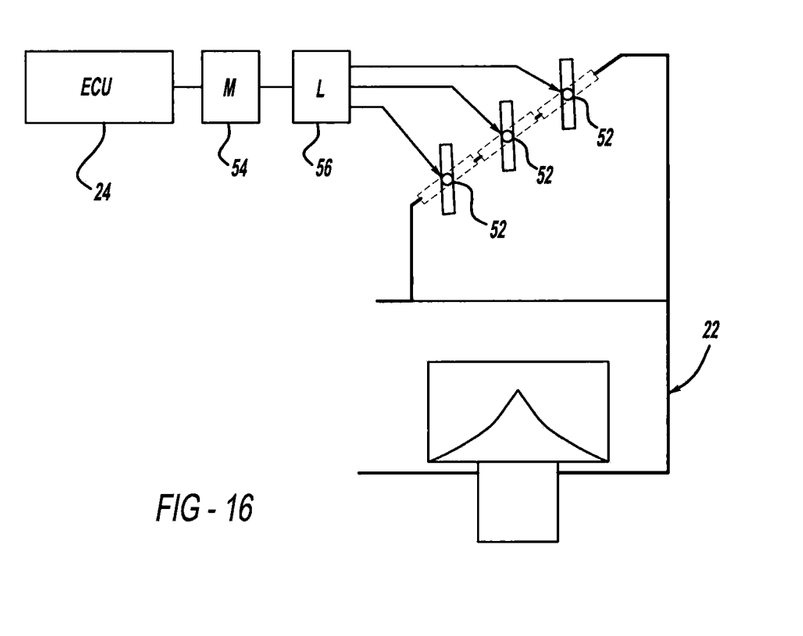
FIG. 16 is a cross sectional schematic view of an air conditioning apparatus in the fifth embodiment.

FIG. 16 is a cross sectional schematic view of the air conditioning apparatus 4 in the fifth embodiment.

The fifth embodiment uses motor actuated doors 52. More specifically, the preventing means in this fifth embodiment is a plurality of butterfly doors 52 disposed at an upstream side of the second blower 22. The plurality of butterfly doors 52 are actuated by a motor 54 via a link mechanism 56, and may be controlled in accordance with an estimated pressure difference between the static pressure of the first airflow and the second airflow. The other elements of the fifth embodiment are similar to the fourth embodiment.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the Figures. Spatially relative terms may be intended to encompass different orientations of the device in use or operation in addition to the orientation depicted in the Figures. For example, if the device in the Figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An air conditioning apparatus for a vehicle cabin comprising:
    an air conditioning case defining an airflow passage;
    an evaporator accommodated in the air conditioning case;
    a first blower located at an upstream side of the evaporator creating a first airflow in the airflow passage;
    a second blower located at the upstream side of the evaporator creating a second airflow in the airflow passage;
    a heater core at a downstream side of the evaporator;
    a dividing wall extending through the heater core and dividing the air conditioning case into front air passages and rear air passages;
    a flow ratio control door arranged in a first gap between the evaporator and the heater core, an axis of rotation of the flow ratio control door is at an upstream end portion of the dividing wall, the flow ratio control door is an airflow volume control structure between airflow directed to a front side of the vehicle cabin through the front air passages, and airflow directed to a rear side of the vehicle cabin through the rear air passages;
    a front air-mix door arranged in the first gap on an upstream side of the front air passages and configured to control airflow through the front air passages;
    a rear air-mix door arranged in the first gap on an upstream side of the rear air passage and configured to control airflow through the rear air passage;
    a second gap defined between an upstream heat exchange surface of the evaporator and downstream ends of each of the first blower and the second blower, the second gap is a mixing chamber where first airflow from the first blower and second airflow from the second blower is mixed prior to passing through the evaporator;
    a control panel disposed in the vehicle cabin operated by a user for setting a preferred air condition setting of the user; and
    a controller electrically connected to the first blower, the second blower and the control panel;
    wherein:
    the controller is configured to calculate a target total airflow amount based on at least the preferred air condition setting;
    the controller is further configured to determine a blower level of the first blower and a blower level of the second blower based on the target total airflow amount;
    the first airflow and the second airflow are mixed at the upstream side of the evaporator in the second gap;
    when the target total airflow amount is less than a predetermined total airflow amount, an amount of increase of the first blower level per a unit increase of the target total airflow amount is larger than the amount of increase of the second blower level; and
    when the target total airflow amount is equal to or greater than the predetermined total airflow amount, the amount of increase of the first blower level per the unit increase of the target total airflow amount is smaller than the amount of increase of the second blower level.

2. The air conditioning apparatus according to claim 1, wherein the predetermined total airflow amount is approximately equal to an amount of the first airflow created by a maximum blower level of the first blower.

3. The air conditioning apparatus according to claim 1, wherein the amount of increase of the second blower level corresponds to an increase of static pressure of the first airflow.

4. A method of controlling an air conditioning apparatus for a vehicle cabin, the air conditioning apparatus equipped with an air conditioning case defining an airflow passage, an evaporator accommodated in the air conditioning case, a control panel disposed in the vehicle cabin operated by a user for setting a preferred air condition setting of the user, a first blower located at an upstream side of the evaporator creating a first airflow in the airflow passage, and a second blower located at an upstream side of the evaporator creating a second airflow in the airflow passage, wherein the first airflow and the second airflow are mixed at the upstream side of the evaporator, the method comprising:
    determining a target total airflow amount based on at least the preferred air condition setting of the user;

setting a blower level of the first blower based on the target total airflow amount and setting a blower level of the second blower based on the blower level of the first blower when the target total airflow amount is less than a predetermined total airflow amount;

setting the blower level of the first blower to a maximum blower level, and setting the blower level of the second blower to achieve the target total airflow amount when the target total airflow amount is equal to or greater than the predetermined total airflow amount;

when both the first and second blowers are active, mixing the first airflow and the second airflow in a gap defined between an upstream heat exchange surface of the evaporator and downstream ends of each of the first blower and the second blower such that the mixing occurs prior to the airflow passing through the evaporator;

directing the mixed airflow through front air passages or rear air passages of the air conditioning case by rotating a flow ratio control door arranged between a downstream surface of the evaporator and a heater core, an axis of rotation of the flow ratio control door is at an upstream end of a dividing wall extending through the heater core, the dividing wall dividing the air conditioning case into the front air passages and the rear air passages, the flow ratio control door is an airflow volume control structure between airflow directed to a front side of the vehicle cabin through the front air passages and airflow directed to a rear side of the vehicle cabin through the rear air passage;

controlling airflow through the front air passages with a front air-mix door arranged between the evaporator and the heater core on an upstream side of the front air passages; and controlling airflow through the rear air passage with a rear air-mix door arranged between the evaporator and the heater core on an upstream side of the rear air passage.

5. The method of controlling the air conditioning apparatus according to claim 4, wherein when the target total airflow amount is less than the predetermined total airflow amount, the blower level of the second blower is set to create the second airflow having a dynamic pressure equal to a static pressure of the first airflow.

6. An air conditioning apparatus for a vehicle cabin comprising:
an air conditioning case defining an airflow passage;
an evaporator accommodated in the air conditioning case;
a first blower located at an upstream side of the evaporator creating a first airflow in the airflow passage;
a second blower located at the upstream side of the evaporator creating a second airflow in the airflow passage;
a heater core at a downstream side of the evaporator;

a dividing wall extending through the heater core and dividing the air conditioning case into front air passages and rear air passages;

a flow ratio control door arranged in a first gap between the evaporator and the heater core, an axis of rotation of the flow ratio control door is at an upstream end portion of the dividing wall, the flow ratio control door is an airflow volume control structure between airflow directed to a front side of the vehicle cabin through the front air passages, and airflow directed to a rear side of the vehicle cabin through the rear air passages;

a front air-mix door arranged in the first gap on an upstream side of the front air passages and configured to control airflow through the front air passages;

a rear air-mix door arranged in the first gap on an upstream side of the rear air passage and configured to control airflow through the rear air passage;

a second gap defined between an upstream heat exchange surface of the evaporator and downstream ends of each of the first blower and the second blower, the second gap is a mixing chamber where the first airflow from the first blower and the second airflow from the second blower is mixed prior to passing through the evaporator;

a control panel disposed in the vehicle cabin operated by a user for setting a preferred air condition setting of the user; and a controller electrically connected to the first blower, the second blower and the control panel wherein:

the controller is configured to calculate a target total airflow amount based on at least the preferred air condition setting of the user the controller is further configured to determine a blower level of the first blower and a blower level of the second blower based on the target total airflow amount the first airflow and the second airflow are mixed at the upstream side of the evaporator in the second gap;

the air conditioning apparatus further comprising means for preventing the first airflow from being directed into the second blower; and when the target total airflow amount is less than a predetermined total airflow amount, the controller uses the first blower, and the preventing means prevents the first airflow from being directed into the second blower.

7. The air conditioning apparatus according to claim 6, wherein the preventing means comprises a damper and a motor actuating the damper.

* * * * *